J. P. CLARE.
SELF HEALING COMPOSITION FOR INNER TUBES OF TIRES.
APPLICATION FILED AUG. 20, 1913.

1,137,461.

Patented Apr. 27, 1915.

UNITED STATES PATENT OFFICE.

JAMES P. CLARE, OF STRATHAM, NEW HAMPSHIRE.

SELF-HEALING COMPOSITION FOR INNER TUBES OF TIRES.

1,137,461.

Specification of Letters Patent. Patented Apr. 27, 1915.

Application filed August 20, 1913. Serial No. 785,617.

*To all whom it may concern:*

Be it known that I, JAMES P. CLARE, of Stratham, in the county of Rockingham and State of New Hampshire, have invented a new and useful Improvement in Self-Healing Compositions for Inner Tubes of Tires, of which the following is a full, clear, and exact description, reference being had to the accompanying drawings, forming a part of this specification, in explaining its nature.

The present invention relates to a composition or filling for the inner tubes of tires whereby the tube will be self healing in the event of puncture.

The object of my invention is to provide a composition which will not harden, but will retain its viscosity or such viscosity that it may continue to perform the self healing function for which it is designed.

The composition is described in the light of its application to a tube and which application can best be seen and understood by reference to the drawings, in which—

Figure 1:
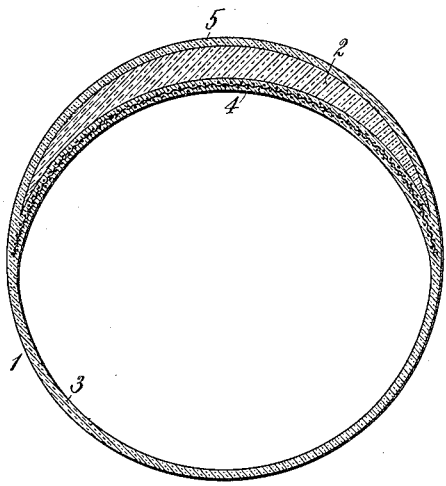
Figure 2:
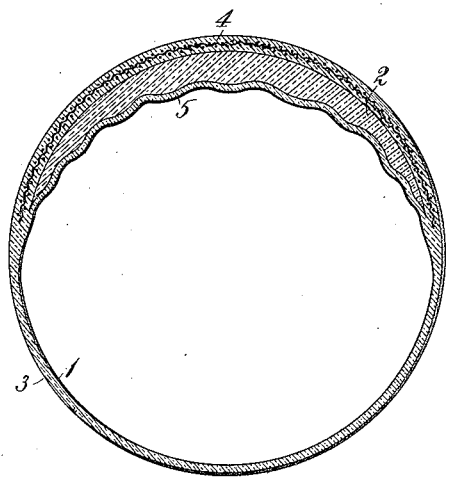

Figure 1 shows a cross section of a tube provided with the composition embodying my invention. Fig. 2 is the same section of tube as shown in Fig. 1, but which is turned inside out for purposes which will hereinafter be explained and which illustrates the ultimate formation of the tube.

Referring to the drawings: 1 represents the inflatable body of the tube which is made in the usual manner of vulcanized rubber. The body 1 of the tube in the outer part or section, or that portion facing the tread of the tire, which is liable to become punctured, is made of sufficient thickness to provide a chamber or cavity in the interior thereof and this is filled with a mass or body of some non-fluid but soft and viscous (sticky or adhesive) elastic unvulcanizable substance 2. In this connection it should be understood that attempt has been made to fill the wall of the tube with some substance softer than the substance forming the wall of the tube and which was intended to become self-sealing in case of puncture. The substance employed, however, was soft rubber which on the face of it possessed the characteristics of a proper filler. I have found, however, that vulcanizable rubber, no matter how soft and viscous, cannot be employed in the present connection, and a tube filled therewith soon possesses no advantage over an ordinary tube for the following reasons: The sulfur in the vulcanized rubber forming the main walls of the tube will soon permeate the soft rubber filling and, as the tube becomes heated during use, the filling will soon vulcanize, losing all the desired characteristics and become practically an inherent or solid part of the wall of the tube, the result, in other words, being a tube having only a thickened face portion.

The filler 2 which I employ has for its base india rubber medium, or "reclaimed rubber" ground fine and the particles thereof bound together by an unvulcanizable binder which together with the "reclaimed rubber" will produce a compound possessing all the characteristics above explained. The best binder which I can find after long experiment is one made up of three ingredients, each in itself possessing the characteristics of a binder and which when compounded or combined for binding together the "reclaimed rubber" base will produce a non-fluid filling, soft and viscous, elastic and unvulcanizable. Such a binder is composed of tar, soft vorite and petrolatum compounded preferably in the following proportions: 10 parts "reclaimed rubber," 2 parts tar, 1 part petrolatum, 2 parts soft vorite, and by vorite is meant oxidized linseed oil, or any oxidized oil, particularly oxidized drying or semi-drying oils. The parts are compounded by mixing them together in a receptacle and then applying a moderate heat until the mass has become homogenous. After the compounding of the mass it may be rolled out in sheets and it is then ready for use.

The especial characteristics of the substances above enumerated are as follows: The "reclaimed rubber" comprises an unvulcanizable base. The other agents act not only as a binder for the "reclaimed rubber" but assist one another in imparting a proper consistency to the resultant compound. In other words, the petrolatum operates to soften and keep soft the tar, while the vorite imparts a lightness and elasticity to the entire binder.

The filler lies within the wall of the tube in a relatively thin layer of sufficient width to protect that portion of the tube liable to become punctured, and extends throughout the length of the tube.

The filler is maintained within the tube under constant compression by the wall of the tube inclosing it. This is accomplished during the formation of the tube simply by turning the tube when initially formed (or as shown in Fig. 1) inside out. Thereupon the inner surface 3 of the wall of the body of the tire when initially formed as shown in Fig. 1, will become the outer surface thereof, as shown in Fig. 2, and with the effect, also, that that portion 4 of the wall lying inside the filling as shown in Fig. 1 will lie outside the same as shown in Fig. 2 and thereby become stretched or drawn taut over the filling, operating to compress the same. At the same time that portion 5 of the wall lying outside the filling before the tube is turned as shown in Fig. 1, will lie inside the filling after the tube is turned as shown in Fig. 2 and will thereby become contracted or crowded into a lesser space than that initially occupied by it and will accordingly, by reason of such contraction, become forced against the soft filling, tending further to compress the same. I prefer, also, to reinforce that portion 4 of the wall lying inside the filling before it is turned and outside the same after it is turned, by applying thereto or embedding therein a piece or sheet of canvas or other flexible but non-stretchable material 6, so that as this portion of the wall tends to become stretched over the filling for compressing the same as aforesaid, it will be held by the canvas and thereby made to hug tighter against the filling for compressing it.

A tube having the filler as above described is practically self-sealing. In the event of puncture the separated portions of the filler are brought together by the compressing wall of the tube, the presser of air within the tube assisting therein. As the separated portions of the filler come together they permanently adhere owing to the viscous nature of their substance.

As above stated the elastic plastic material 2, is unvulcanizable. I call attention to the fact that as above stated the material must be unvulcanizable, or non-vulcanizable, in order to prevent this material from hardening in the tire, which would entirely defeat the objects of my invention. I disclaim the use of any vulcanizable mixtures.

The material 2 when used in the tire, in the manner described, does not become vulcanized therein, but retains its original consistency, which is semiplastic, and somewhat elastic.

In some instances I have vulcanized the part 5 to the part 4, by heating the two pieces of stock, containing sulfur and rubber mixed with each other, said heating being continued for 45 minutes, and under a steam pressure of 45 pounds. This treatment does not vulcanize the semi-plastic material 2, and does not appear to in any way alter the consistency of said material.

What I claim as my invention is:

1. A healing composition for the inner tubes of tires, comprising a mixture of reclaimed rubber, tar and a softening agent, said composition having a semiplastic consistency, and being somewhat elastic, and retaining these properties, when the same is heated under a steam pressure of 45 pounds for 45 minutes.

2. A healing composition for the inner tubes of tires, comprising a mixture of reclaimed rubber, vorite, tar and a softening agent, said composition having a semi-plastic consistency, and being somewhat elastic, and retaining these properties, when the same is heated under a stem pressure of 45 pounds for 45 minutes.

3. A self healing composition for application to the inner tubes of tires, comprising reclaimed rubber, tar, petrolatum and oxidized oil, said composition having a semi-plastic consistency and being somewhat elastic.

4. A self healing composition for the inner tubes of tires, said composition comprising reclaimed rubber, tar, petrolatum and vorite, said material not being vulcanized, when heated in contact with rubber containing sulfur.

5. A self-healing composition for the inner tubes of tires, comprising approximately ten parts reclaimed rubber, two parts tar, one part petrolatum, and two parts vorite.

6. A healing composition for the inner tubes of tires comprising a mixture of reclaimed rubber, tar and a softening agent, said composition having a semi-plastic consistency and being semi-elastic and retaining these properties when heated in contact with rubber containing sulfur.

JAMES P. CLARE.

Witnesses:
 JOHN E. R. HAYES,
 M. E. FLAHERTY.